2 Sheets—Sheet 1.

C. H. HAYDEN.

FIRE-KINDLER.

No. 7,740. Reissued June 12, 1877.

Attest.
H. L. Perrine
J. A. Rutherford

Chas H Hayden.
Inventor.
By. James L. Norris
Attorney

2 Sheets—Sheet 2.

C. H. HAYDEN.

FIRE-KINDLER.

No. 7,740. Reissued June 12, 1877.

Attest:
H. C. Perrine
J. A. Rutherford

Chas. H. Hayden.
Inventor.
By. James L. Norris.
Attorney.

UNITED STATES PATENT OFFICE.

CHARLES H. HAYDEN, OF COLUMBUS, OHIO.

IMPROVEMENT IN FIRE-KINDLERS.

Specification forming part of Letters Patent No. 189,310, dated April 10, 1877; reissue No. 7,740, dated June 12, 1877; application filed May 24, 1877.

*To all whom it may concern:*

Be it known that I, CHARLES H. HAYDEN, of Columbus, in the county of Franklin and State of Ohio, have invented a new and useful Improvement in Manufactured Fire-Kindlers; and I do hereby declare that the following is a full, clear, and exact description thereof, reference being had to the accompanying drawings, forming part of this specification, in which—

Figure 1:
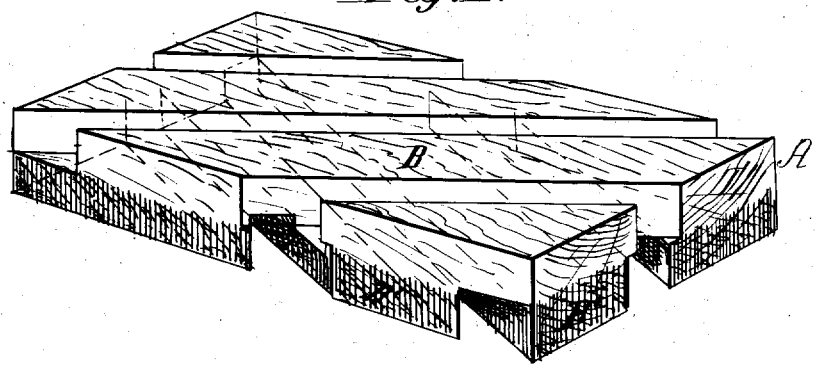
Figure 2:
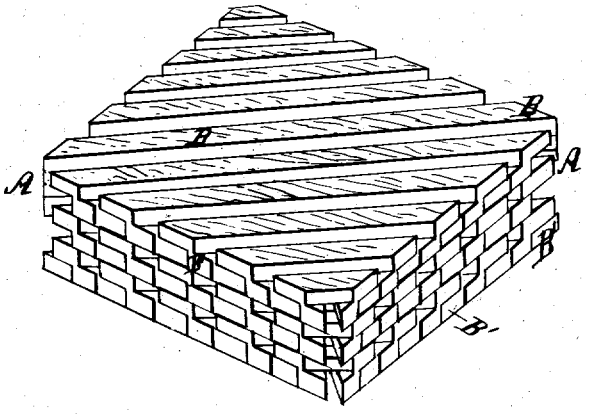
Figure 3:
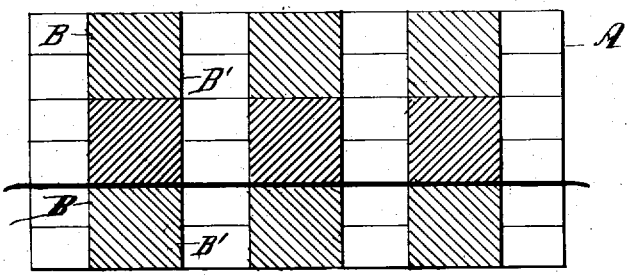
Figure 4:
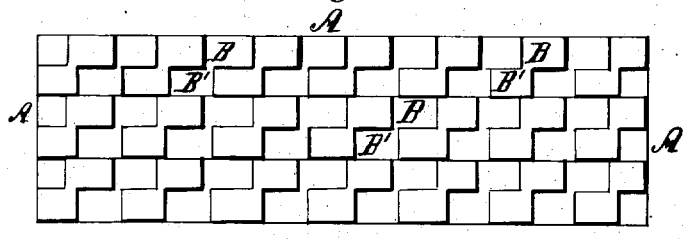
Figure 5:
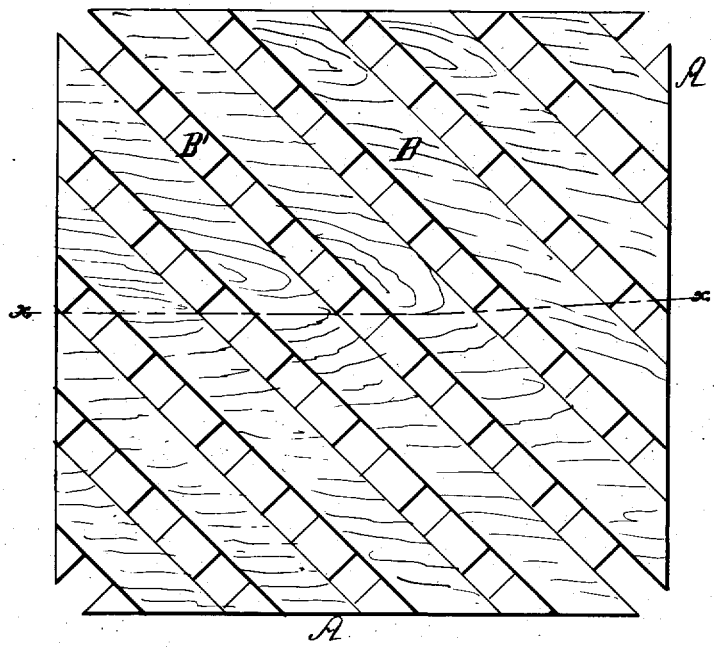

Figure 1 is a perspective view of my fire-kindler; Fig. 2, a perspective view of a pile formed of such kindlers; Fig. 3, a vertical central section of the same in the line *x x* of Fig. 5. Fig. 4 is a side elevation, and Fig. 5 a top view, of the same.

This invention relates to certain improvements in that description of fire-kindlers constructed of blocks of wood or timber made with a series of passages to facilitate the ignition and combustion of the block; the object of my invention being to reduce the cost of material and labor required in the construction of a kindler in such manner as to insure a more perfect disposition of the intact portions of the board for the purposes of ignition and combustion, and so construct the kindlers of sizes adapted for large fire-boxes and furnaces, as well as for small stoves, without using such expensive lumber as heretofore, and without expending an unwarrantable amount of labor on an article of this description, which, if used by the public, must be furnished at the smallest cost to the consumer.

Heretofore fire-kindlers have been formed by cutting them from a piece of timber at right angles to the direction of the grain, the surfaces of such blocks running at right angles to the grain being provided with intersecting communicating grooves or passages.

The block in this manner is divided up into a series of smaller connected blocks, which present the ends of the grain to the action of the fire when ignited.

As thus constructed, the fibers of the wood are not disposed or arranged in the most convenient position for the most effective ignition and combustion, and the blocks are also unnecessarily expensive, and involve too much labor in their preparation.

By my invention these objections are obviated; and to this end my improved kindler consists of a rectangular piece of board of suitable size cut into a series of obliquely or otherwise arranged fagots or sticks lying crosswise, forming a kindler in which the intact portions of the wood will be most advantageously arranged for proper ignition.

In carrying out my invention I take boards of proper width and thickness, and cut the same in pieces of suitable lengths, and in the top and bottom of each piece A of said board I form fagots or sticks B and B′ of suitable width, by cutting out on each side portions of the wood, so as to leave spaces dividing the board virtually into two series of fagots or sticks, one series arranged crosswise with respect to the others, the intact portions of the parts forming the fagots being connected at their intersections, forming a rectangular kindler, in which the fagots will present the grain of the wood lengthwise to the action of the fire when ignited—the position in which the wood will most effectually take fire and continue to burn.

For making the fagots or sticks out of the board a "wabble" saw is preferably employed, although the said fagots may be produced by other means.

The pieces of board prepared as described may be daubed or saturated with rosin and oil, or other cheap and readily combustible materials, and upon the coated surface paper, coarse sawdust, or shavings may be placed, so as to adhere when the composition becomes dry and hard.

Two or more of the connected fagots as thus prepared may be placed one upon the other to form a pile, if desired, and united by means of rosin or oil, or in any other convenient manner, and the paper or other similar igniting substance may be applied, so as to come between the series of fagots, or it may be applied only on the ends or sides of the pile.

From an inspection of the drawing it will be readily seen that a very large number of channels for the promotion of combustion are afforded between each series of fagots, and also from top to bottom of the same, and that these passages all communicate and extend throughout the fagots to all sides thereof.

In some cases a pile of a more costly character, but having all the passages shown and described, might be produced by piling up strips or fagots of half the thickness of the plank or board pieces; but in such construction the top strips or fagots for forming the upper channels or passages of a piece, A, would have to be united to the bottom strips or fagots, so as to form the bottom channels or passages, such sections thus formed of strips or fagots would then be piled one upon another.

I prefer, however, to use the single kindlers or pieces A made up so as to present the strips or fagots crossing each other obliquely, and united at their intersections with unbroken channels or passages between said strips or fagots, as represented, as the manufacturing of such kindler or kindlers is accomplished with comparative ease and facility, and the expense and labor much lessened, and the same of themselves constitute a new article of manufacture.

The advantages of my invention will be apparent from the above description.

The board being formed into strips or fagots crossing each other obliquely, present the wood in much better position to take fire and continue to burn than where the ends of the grain of wood are presented, as in the blocks as heretofore constructed, insuring thorough combustion and obviating all tendency of the kindler to become extinguished before igniting the superincumbent mass of fuel.

What I claim, and desire to secure by Letters Patent, is—

1. A fire-kindler consisting of a board, A, cut into two series of obliquely or otherwise arranged sticks B B′, united intact at their intersections, and having intermediate passages for the promotion of combustion, substantially as and for the purposes specified.

2. A kindling-pile constructed of two or more pieces of board, A, each cut into a series of obliquely or otherwise arranged sticks, B B′, united intact at their intersections, said pieces A being united together, leaving passages for the promotion of combustion, substantially as specified.

In testimony that I claim the foregoing I have hereunto set my hand in the presence of two witnesses.

CHARLES H. HAYDEN.

Witnesses:
H. C. KRONENBITTER,
J. W. BALDWIN.